(12) United States Patent
Zhang et al.

(10) Patent No.: US 8,077,459 B2
(45) Date of Patent: Dec. 13, 2011

(54) ELECTRONIC DEVICE WITH EXPANSION CARD

(75) Inventors: Ya-Ni Zhang, Shenzhen (CN); Wen-Hu Lu, Shenzhen (CN); Yi-Lung Chou, Taipei Hsien (TW); Li-Ping Chen, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 128 days.

(21) Appl. No.: 12/721,406

(22) Filed: Mar. 10, 2010

(65) Prior Publication Data
US 2011/0103010 A1 May 5, 2011

(30) Foreign Application Priority Data
Oct. 29, 2009 (CN) .......................... 2009 2 0313665

(51) Int. Cl.
*H05K 7/20* (2006.01)
*H05K 7/00* (2006.01)
(52) U.S. Cl. ................... 361/695; 361/694; 454/184
(58) Field of Classification Search ............ 361/679.48–679.51, 694, 695; 454/184
See application file for complete search history.

(56) References Cited

U.S. PATENT DOCUMENTS

| | | | | |
|---|---|---|---|---|
| 6,396,690 | B1 * | 5/2002 | Blatti | 361/690 |
| 6,772,246 | B2 * | 8/2004 | Kim et al. | 710/62 |
| 7,310,241 | B2 * | 12/2007 | Peng et al. | 361/801 |
| 2002/0037048 | A1 * | 3/2002 | Van Der Schaar et al. | 375/240.12 |
| 2003/0016496 | A1 * | 1/2003 | Kim et al. | 361/695 |
| 2003/0043540 | A1 * | 3/2003 | Chen et al. | 361/687 |
| 2004/0174687 | A1 * | 9/2004 | Wang et al. | 361/801 |
| 2005/0059285 | A1 * | 3/2005 | Chen et al. | 439/325 |
| 2008/0013297 | A1 * | 1/2008 | Tao et al. | 361/801 |
| 2008/0253076 | A1 * | 10/2008 | Chen | 361/684 |

* cited by examiner

*Primary Examiner* — Gregory Thompson
(74) *Attorney, Agent, or Firm* — Altis Law Group, Inc.

(57) ABSTRACT

An electronic device includes a chassis. The chassis has a bottom wall and a rear wall, substantially perpendicular to the bottom wall. A motherboard is disposed on the bottom wall, and a riser card is perpendicularly connected to the motherboard. An expansion card is substantially parallel to the motherboard and coupled to the riser card. The expansion card has a first end and a second end, and the first end is secured to the rear wall. An airflow duct is located on the bottom wall of the chassis. A supporting bar protrudes from the airflow duct. A securing member is pivotably mounted to the airflow duct. The securing member includes a pressing plate. The second end of the expansion card is clamped between the pressing plate and the supporting bar of the airflow duct.

13 Claims, 7 Drawing Sheets

FIG. 1

ELECTRONIC DEVICE WITH EXPANSION CARD

BACKGROUND

1. Technical Field

The present disclosure relates an electronic device having an expansion card.

2. Description of Related Art

A computer system usually includes expansion cards, such as sound cards, video cards, graphics cards and so on, for enhancing capabilities of the computer system. Conventionally, an expansion card is coupled to a riser card, and one end of the expansion card is secured to a rear wall of the computer system enclosure. However, some expansion cards are longer than usual. If the longer expansion cards are secured to the computer enclosure in the conventional manner, they will be unstable.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
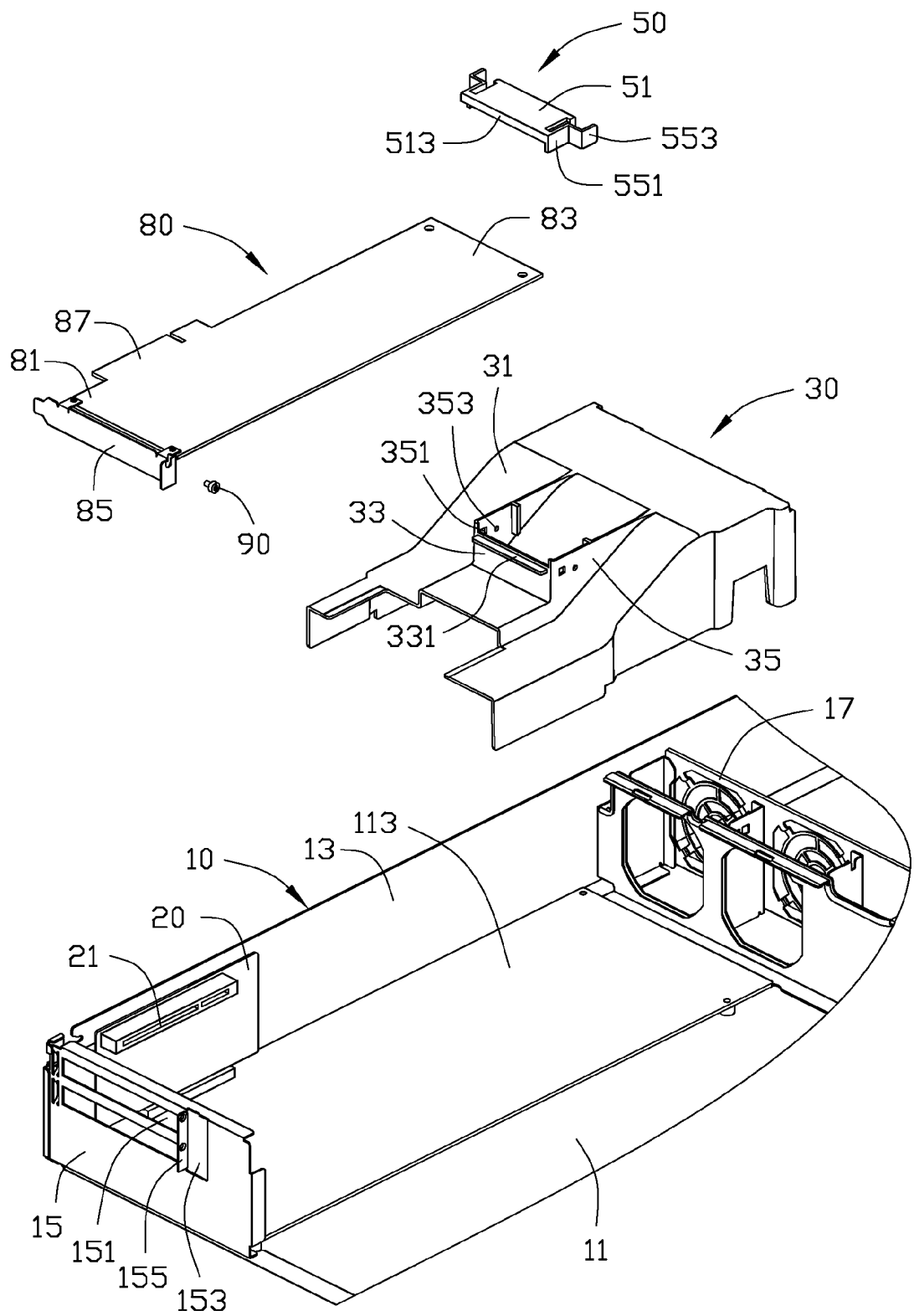
FIG. 1 is an exploded, isometric view of an electronic device, including a securing member and an expansion card, in accordance with an embodiment.
Figure 2:
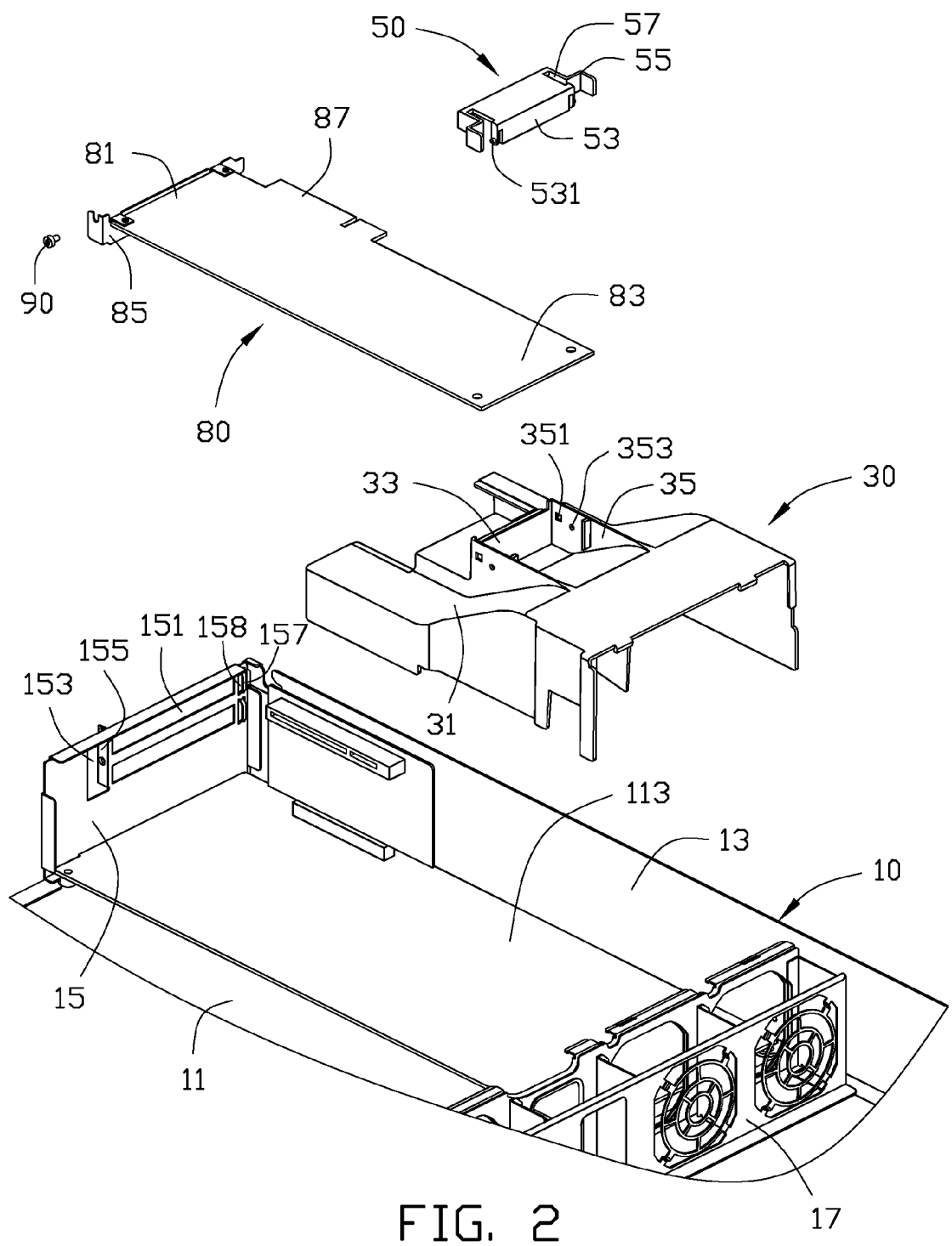
FIG. 2 is similar to FIG. 1, but viewed from a different aspect.

Referring to FIGS. 1 and 2, an electronic device in accordance with one embodiment includes a chassis 10, an airflow duct 30 disposed in the chassis 10, an expansion card 80, and a securing member 50 configured to secure the expansion card 80 in the chassis 10. The expansion card 80 includes a first end 81, an opposite second end 83, a fixing piece 85 secured to the first end 81, and a connecting portion 87.

The chassis 10 includes a bottom wall 11, a sidewall 13, and a rear wall 15 all perpendicular to each other. A motherboard 113 is located on the bottom wall 11. A riser card 20 is positioned adjacent to the sidewall 13 and perpendicularly connected to the motherboard 113. A socket 21 is disposed at one side of the riser card 20. The rear wall 15 defines a plurality of expansion card slots 151. An opening 153 is defined adjacent to the expansion card slots 151. A mounting piece 155 extends from one side edge of the opening 153, and is configured to secure the fixing piece 85 of the expansion card 80. A bridge 157 is located on an inner side of the chassis rear wall 15, at one side adjacent to the expansion card slots 151 and opposite to the opening 153. The bridge 157 defines a slot 158 configured for the fixing piece 85 inserted therein. A fan mounting bracket 17 is secured in the chassis bottom wall 11, and opposite to the chassis rear wall 15. A plurality of fans (not shown) is accommodated in the fan mounting bracket 17, to blow air towards the chassis rear wall 15, for cooling the electronic components, such as a CPU on the motherboard 113.

The airflow duct 30 is configured to guide airflow towards the electronic components on the motherboard 113. The air flow duct 30 includes a top wall 31, a securing plate 33 extending up from the top wall 31, and two opposite side plates 35 perpendicular to the securing plate 33. A supporting bar 331 protrudes from the securing plate 33. Each side plate 35 defines a securing slot 351, adjacent to the securing plate 33, and a pivot hole 353.

Figure 3:
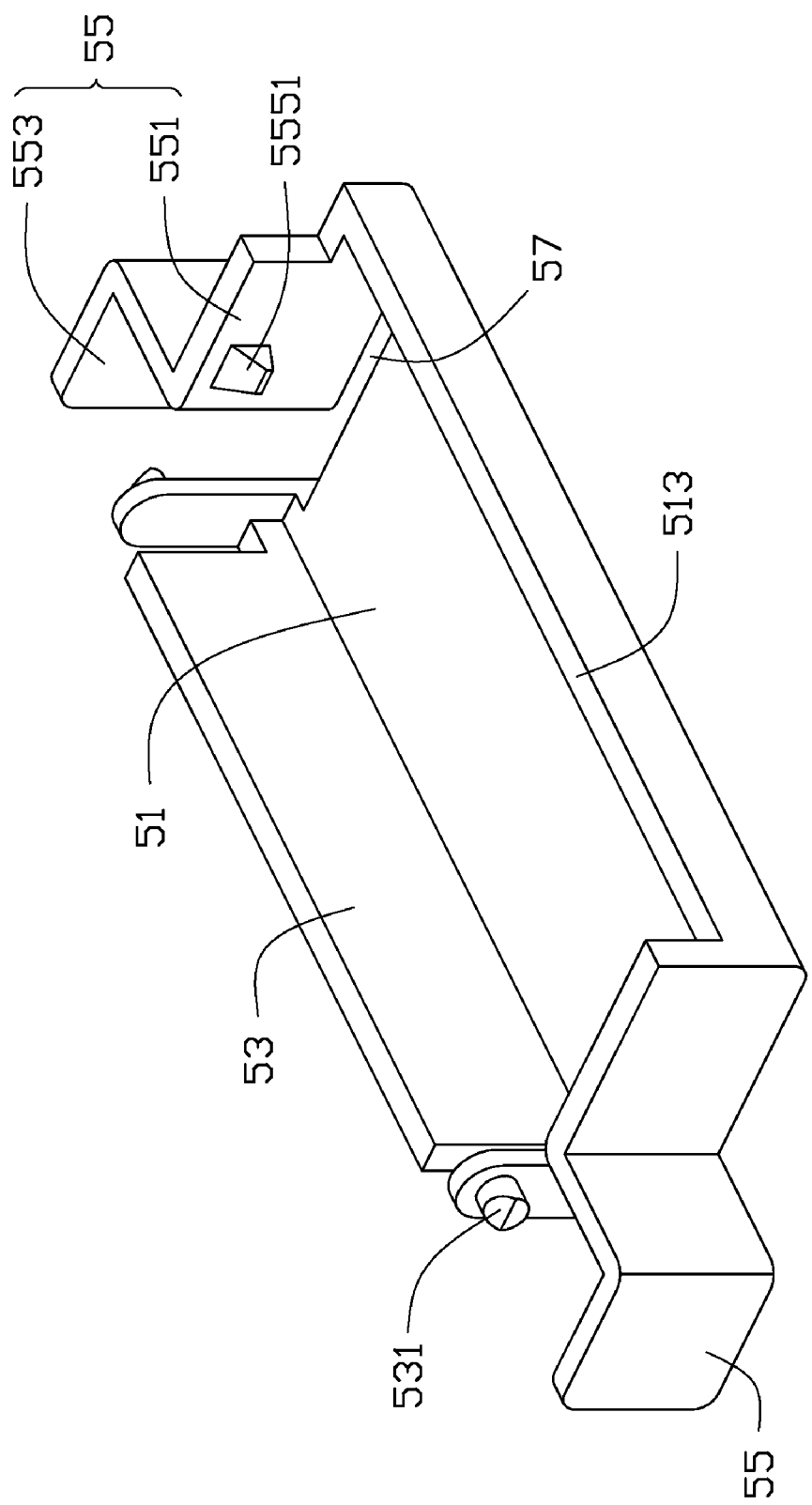
FIG. 3 is an isometric view of the securing member of FIG. 1, but from a different aspect.

Referring to FIG. 3, the securing member 50 includes a pressing plate 51. A pressing bar 513 is bent from one side edge of the pressing plate 51. A mounting wall 53 perpendicularly extends from an opposite side edge of the pressing plate 51. Two pivot posts 531 protrude from two sides of the mounting wall 53, and correspond to the pivot holes 353 in the side plates 35 of the airflow duct 30. Two elastic handles 55 extend from opposite sides of the pressing bars 513. Each elastic handle 55 includes an engaging piece 551 and an operating tab 553 connected to the engaging piece 551. A block 5551 protrudes from an inner side of the engaging piece 551 and is configured to engage in the securing slot 351 of the airflow duct 30. In one embodiment, the block 5551 is wedge-shaped. A slit 57 is defined between the engaging piece 551 and the pressing plate 51.

Figure 4:
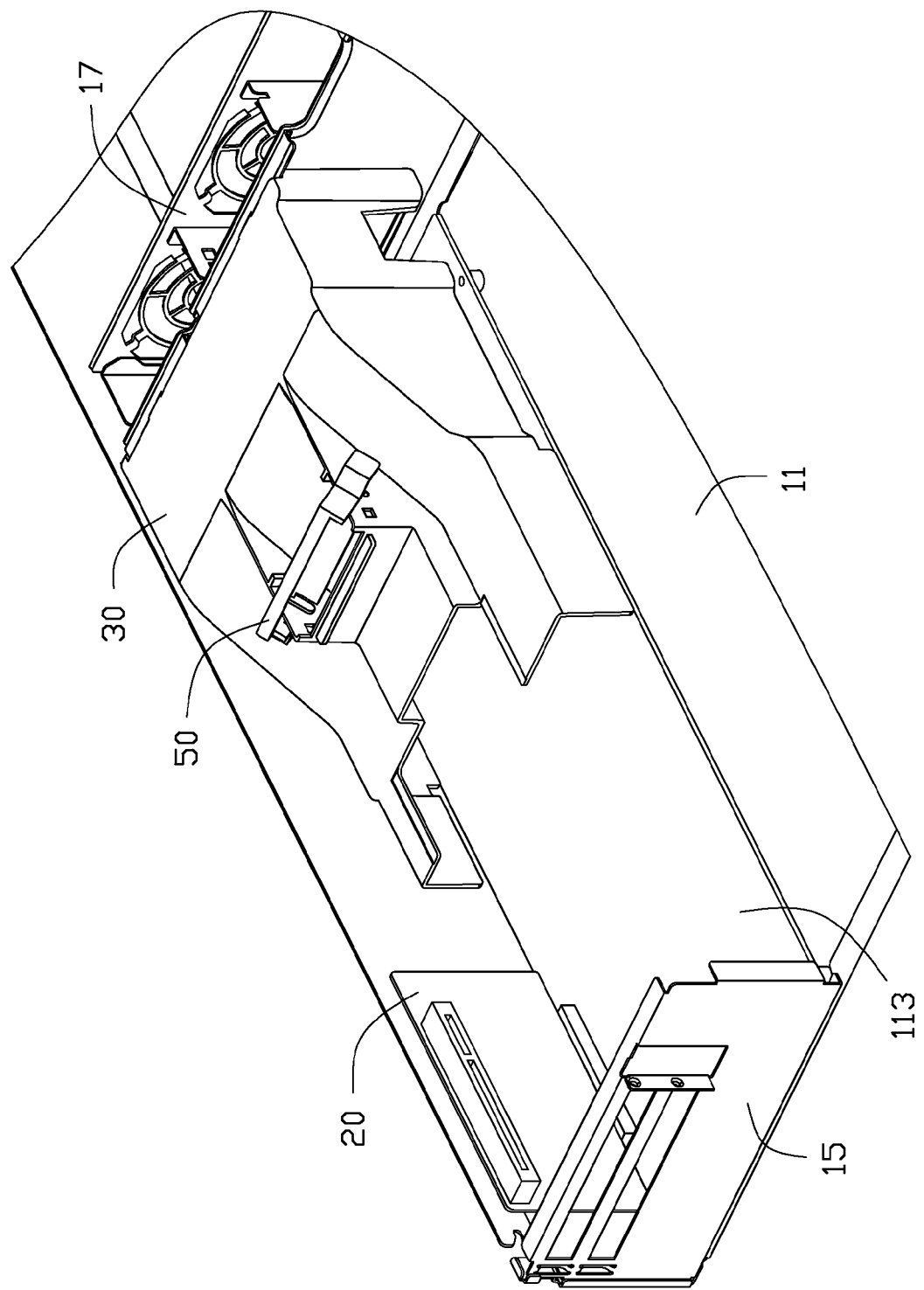
FIG. 4 is an assembled view of the electronic device of FIG. 1, but without the expansion card.

Referring to FIG. 4, in assembly, the airflow duct 30 abuts against the fan mounting bracket 17 and is secured in the chassis 10. The airflow duct 30 guides air from the fans towards the rear wall 15 of the chassis 10. The pivot posts 531 of the securing member 50 engage in the pivot holes 353 of the airflow duct 30. The pivot posts 531 and the pivot holes 353 cooperatively define a pivot axis perpendicular to the sidewall 13 of the chassis 10. Thus, the securing member 50 is mounted to the securing plate 33 of the airflow duct 30 and rotatable about the pivot axis.

Figure 5:
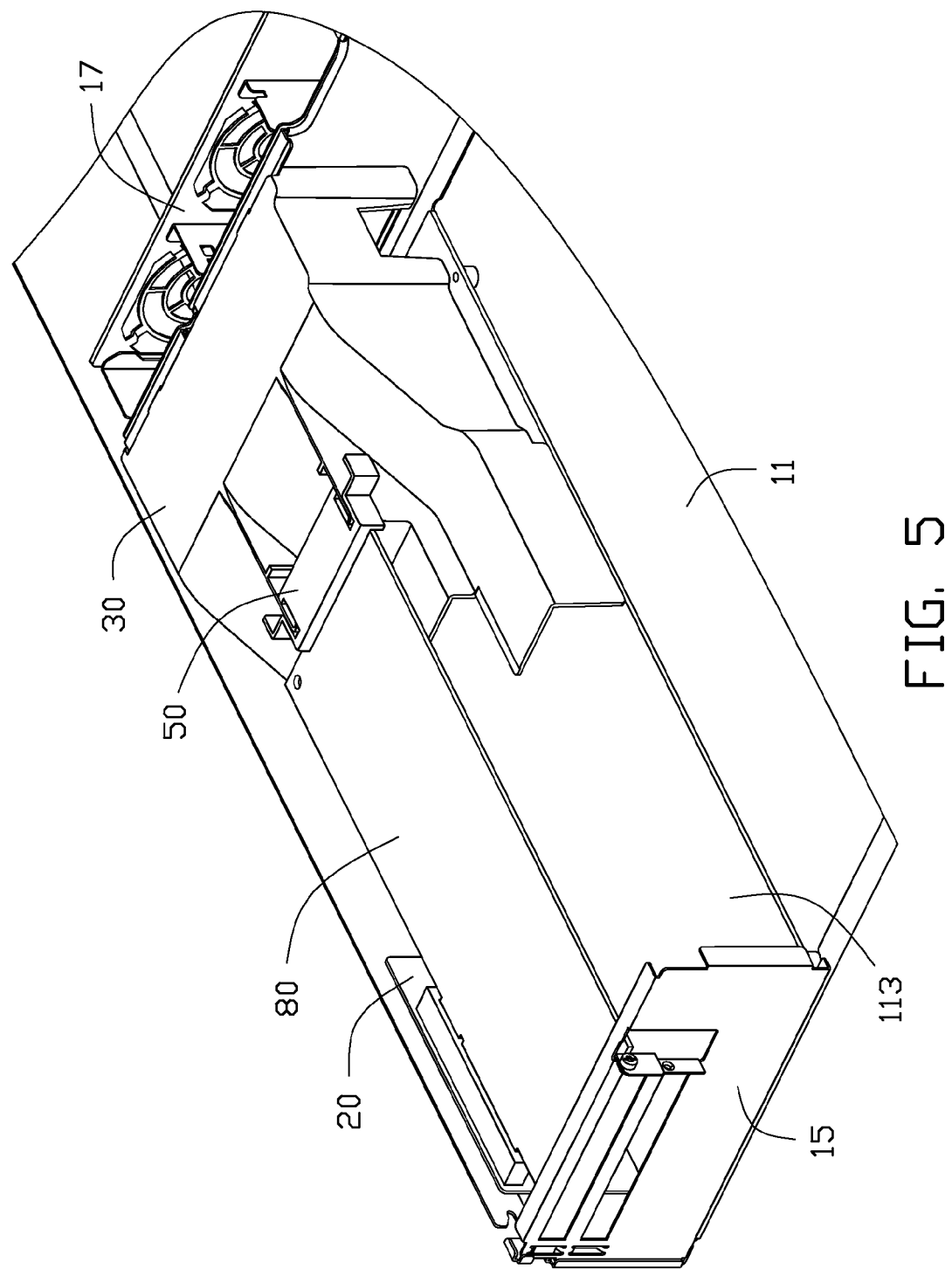
FIG. 5 is an assembled view of FIG. 1.
Figure 6:
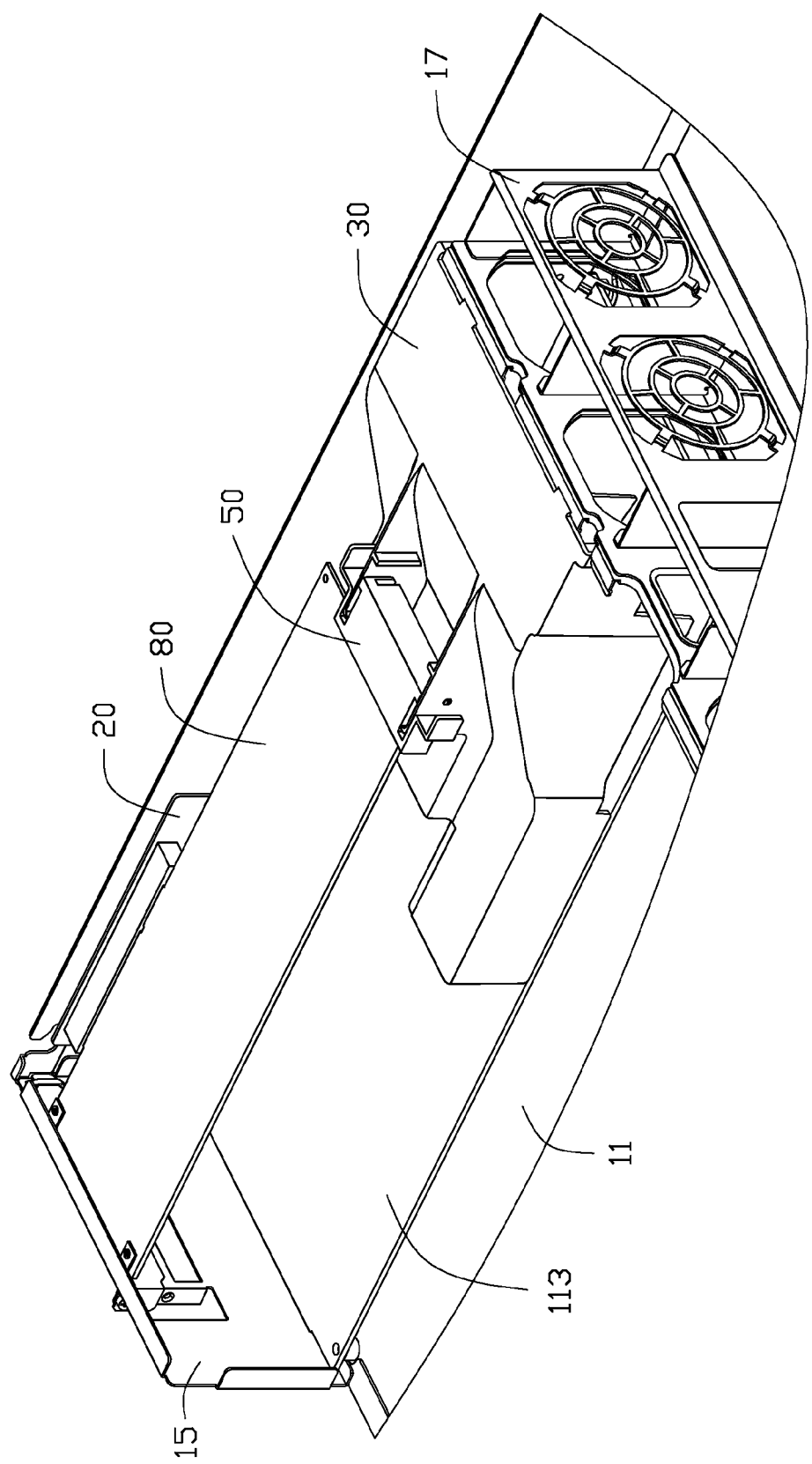
FIG. 6 is an assembled view of FIG. 2.

Referring also to FIGS. 5 and 6, in assembly, the fixing piece 85 of the expansion card 80 is inserted in the slot 158 of the bridge 157. The connecting portion 87 of the expansion card 80 is inserted in the socket 21 of the riser card 20. The first end 81 of the expansion card 80 is coupled to one expansion card slot 151 in the chassis rear wall 15 and secured to the chassis rear wall 15 with a fastener 90. The second end 83 of the expansion card 80 is located on the supporting bar 331 of the securing plate 33. Then, the securing member 50 is rotated about the pivot axis, the blocks 5551 slide along the side plates 35 of the airflow duct 30, and the elastic handles 55 are elastically deformed outward. When the blocks 5551 engage in the securing slots 351, the elastic handles 55 rebound to hold the securing member 50 in a closed position. Thus, the second end 83 of the expansion card 80 is clamped between the supporting bar 331 of the securing plate 33 and the pressing bar 513 of the securing member 50. The expansion card 80 is secured in the chassis 10 parallel, to the motherboard 113.

Figure 7:
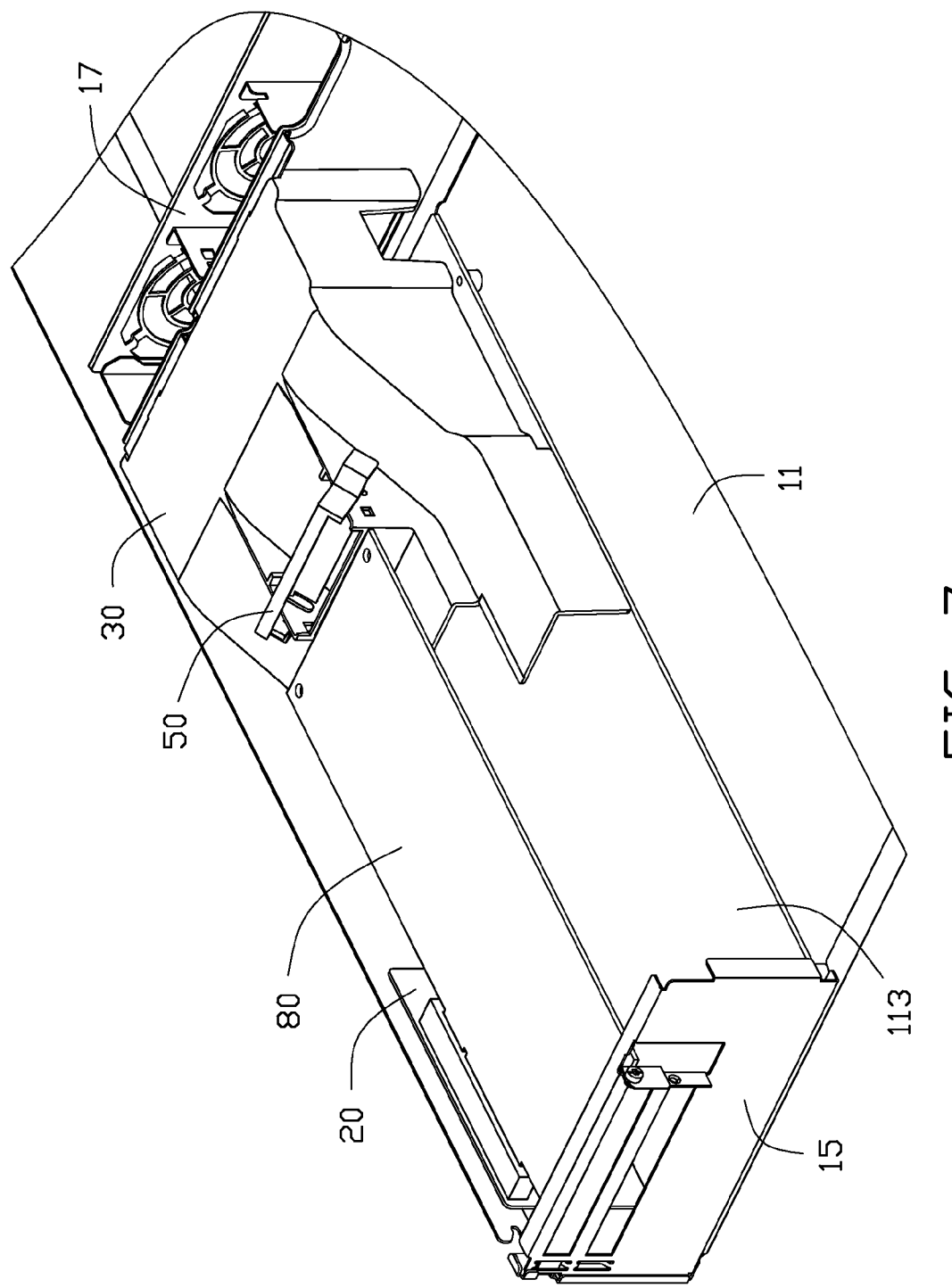
FIG. 7 is similar to FIG. 6, with the securing member in an unlocked position.

Referring to FIG. 7, in disassembly, the elastic handle 55 is pushed away from the side plates 35 of the airflow duct 30. The blocks 5551 are disengaged from the securing slot 351 of the airflow duct 50. Then, the securing member 50 is pivoted away from the expansion card 80. Thus, the second end 83 of the expansion card 80 is released. When the fastener 90 at the first end 81 of the expansion card 80 is loosened, the expansion card 80 may be removed from the chassis 10.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. An electronic device, comprising:
a chassis having a bottom wall, and a rear wall substantially perpendicular to the bottom wall;
a motherboard disposed on the bottom wall, and a riser card perpendicularly connected to the motherboard;
an expansion card substantially parallel to the motherboard and coupled to the riser card, the expansion card having a first end and a second end, and the first end being secured to the rear wall;
an airflow duct located in the chassis, a supporting bar protruding from the airflow duct; and
a securing member pivotably mounted to the airflow duct, the securing member comprising a pressing plate, the second end of the expansion card being clamped between the pressing plate and the supporting bar.

2. The electronic device of claim 1, wherein a fan mounting bracket is mounted on the bottom wall, and the airflow duct abuts the fan mounting bracket and is configured to guide air flow towards the rear wall of the chassis.

3. The electronic device of claim 1, wherein the airflow duct comprises a top wall and two opposite side plates extending from the top wall; and the securing member is pivotably engaged with the two side plates.

4. The electronic device of claim 3, wherein the chassis comprises a sidewall substantially perpendicular to the bottom wall and the rear wall; the side plates are parallel to the chassis sidewall, and each defines a pivot hole; the pivot holes cooperatively define a pivot axis substantially perpendicular to the chassis sidewall; and the securing member engages in the pivot holes and is rotatable about the pivot axis.

5. The electronic device of claim 4, wherein the securing member further comprises a mounting plate substantially perpendicular to the pressing plate, and two pivot posts protrude from the mounting plate and engage the pivot holes; respectively.

6. The electronic device of claim 4, wherein each side plate of the airflow duct defines a securing slot; two elastic handles extend from the pressing plate, and a securing block protrudes from each of the two elastic handles and engages the securing slots in the side plates; respectively.

7. The electronic device of claim 6, wherein the securing member defines a slit between the pressing plate and each elastic handle; the side plates of the airflow duct are accommodated in the slits; respectively, and the securing blocks are engaged in the securing slots from an exterior of the side plates; respectively.

8. An electronic device, comprising:
a chassis having a bottom wall, a sidewall, and a rear wall;
a motherboard disposed on the bottom wall, and a riser card connected substantially perpendicular to the motherboard;
an expansion card substantially parallel to the motherboard and coupled to the riser card, the expansion card having a first end and a second end, and the first end being secured to the rear wall;
an airflow duct located in the chassis; a supporting bar protrudes from the airflow duct; the airflow duct defining a pivot axis substantially perpendicular to the chassis sidewall; and
a securing member engaged with the airflow duct and rotatable about the pivot axis, the second end of the expansion card being clamped between the securing member and the supporting bar of the airflow duct.

9. The electronic device of claim 8, wherein a fan mounting bracket is mounted on the bottom wall, and the airflow duct abuts the fan mounting bracket and is configured to guide air flow towards the rear wall of the chassis.

10. The electronic device of claim 8, wherein the airflow duct comprises a top wall and two opposite side plates extending from the top wall; and the securing member is pivotally secured to the side plates.

11. The electronic device of claim 10, wherein the securing member further comprises a pressing plate to clamp the expansion card, and a mounting plate perpendicular to the pressing plate; two pivot posts protrude from the mounting plate; and the side plates of the airflow duct define pivot holes for receiving the pivot posts of the securing member; respectively.

12. The electronic device of claim 10, wherein each side plate of the airflow duct defines a securing slot; and two elastic handles extend from the pressing plate, and a securing block protrudes from each of the two elastic handles and engages the securing slots in the side plates; respectively.

13. The electronic device of claim 12, wherein the securing member defines a slit between the pressing plate and each elastic handle; and the side plates of the airflow duct are accommodated in the slits; respectively, so that the securing blocks engaged in the securing slots from an exterior of the side plates of the airflow duct; respectively.

* * * * *